United States Patent
Magsaam (10) Patent No.: US 7,455,137 B2
(45) Date of Patent: Nov. 25, 2008

(54) INDUSTRIAL TRUCK WITH FORCE-TRANSMITTING DOOR WITH DOUBLE HINGE

(75) Inventor: Peter Magsaam, Kleinostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 295 days.

(21) Appl. No.: 11/516,174

(22) Filed: Sep. 6, 2006

(65) Prior Publication Data
US 2007/0075565 A1 Apr. 5, 2007

(30) Foreign Application Priority Data
Sep. 7, 2005 (DE) .................. 10 2005 042 356
Feb. 16, 2006 (DE) .................. 10 2006 007 135

(51) Int. Cl.
*B60R 16/04* (2006.01)

(52) U.S. Cl. ............. 180/68.5; 296/146.11; 296/146.12

(58) Field of Classification Search ............ 296/146.11, 296/146.12, 190.11; 180/65.1, 65.2, 68.5, 180/908; 16/50, 221, 285, 297, 203, 308, 16/347, 366
See application file for complete search history.

(56) References Cited

U.S. PATENT DOCUMENTS

| | | | |
|---|---|---|---|
| 4,655,499 A * | 4/1987 | Piper | 296/146.11 |
| 2005/0093337 A1 | 5/2005 | Herrmann et al. | |
| 2005/0134084 A1 * | 6/2005 | Rangnekar et al. | 296/146.11 |

FOREIGN PATENT DOCUMENTS

DE 103 42 659.0 9/2003

* cited by examiner

*Primary Examiner*—Lori L Lyjak
(74) *Attorney, Agent, or Firm*—The Webb Law Firm (57) ABSTRACT

A counterweighted fork-lift truck has a vehicle frame (1) with a frame segment (2) having a lateral frame opening (2b). A pivoting door (3) covers the frame opening (2a). The door (3) is connected to the vehicle frame (1) by a double hinge (5). Protection against buckling is provided such that when the door (3) is in the closed position, an intermediate door leaf (3a) located between the axes of rotation (A1, A2) can be blocked in position with respect to an adjacent main leaf (3b). The protection against buckling has a spring element (24) with which, in the closed position of the door (3), the intermediate leaf (3a) is biased toward the open position and is in engagement with a stop (25), which is fastened to the main leaf (3b). The intermediate leaf (3a) and the main leaf (3b) enclose an obtuse angle (S).

11 Claims, 10 Drawing Sheets

INDUSTRIAL TRUCK WITH FORCE-TRANSMITTING DOOR WITH DOUBLE HINGE

CROSS-REFERENCE TO RELATED APPLICATIONS

This application claims priority to German Application No. 10 2005 042 356.6, filed Sep. 7, 2005, and German Application No. 10 2006 007 135.2, filed Feb. 16, 2006, which applications are herein incorporated by reference in their entirety.

BACKGROUND OF THE INVENTION

1. Field of the Invention

This invention relates to an industrial truck, such as a counterweighted fork-lift truck, with a vehicle frame that has a frame segment with a lateral frame opening that is realized so that it can hold a battery block. To cover the frame opening, a door is provided that can be pivoted outwardly around an essentially vertical axis of rotation. The door is connected with the vehicle frame by a double hinge, wherein a second axis of rotation is oriented parallel to and located at some distance from the first axis of rotation. During rotation, the door is movable around the first axis of rotation, by which, when the door is in the closed position, an intermediate leaf of the door that is located between the axes of rotation can be blocked in position with respect to an adjacent main leaf.

2. Technical Considerations

An industrial truck is described in DE 103 42 659 A1. On this truck, the double hinge makes it possible to pivot the door in a pivoting range between the closed position and an opening position that is at an approximately right angle to the closed position around the first axis of rotation, and to pivot the door around a second axis of rotation in the pivoting range beyond that. The position of the second axis of rotation makes it possible to achieve an opening angle of the door of 180 degrees, even when there is a counterweight that projects laterally from the frame of the truck. In other words, as a result of the positioning of the second axis of rotation at a distance from the first axis of rotation, a collision of the door with the counterweight (or any other components that may project laterally) of the industrial truck can be prevented. In the closed position, the door therefore fits flush into the lateral contour of the vehicle, i.e., it does not project laterally.

This construction makes it possible for the battery block to be installed and/or removed by a second fork-lift truck. To perform this task, the second fork-lift truck drives so that its fork carrier on which the fork arms are held is as close as possible to the side wall of the vehicle frame, so that it can pick up the battery block. This position is possible without interference because the folding door is in the 180-degree open position.

Because the door and the double hinge are realized so that they contribute to the rigidity of the frame and can be locked in the closed position by a lock that is capable of transmitting forces, in the closed position the door functions as a part of the vehicle frame and absorbs tensile and compression forces. To prevent a rotation of the door around the second axis of rotation when it is subjected to a compression stress, protection against buckling is provided. The purpose of the protection against buckling is to achieve a defined sequence of movement when the door is opened and closed. For this purpose, when the door is opened, it first pivots around the first axis of rotation, whereby the position of the second axis of rotation changes. Once the door has pivoted beyond 90 degrees, the continued rotation is exclusively around the second axis of rotation, which thereby maintains its position.

In one variant that is simple from a manufacturing point of view, the protection against buckling provided on the industrial truck consists of a manually-actuated locking rod, by means of which a rigid connection can be created between the main leaf of the door and the intermediate leaf of the door, which is bounded by the two axes of rotation of the double hinge.

The locking rod, which between the closed position and the 90-degree open position ensures that pivoting around the second axis of rotation is blocked, is disengaged in the 90-degree open position (in the simplest case, manually). In this position, the second axis of rotation is outside the contour of the vehicle. The door can now be pivoted farther to the 180-degree open position, wherein the pivoting movement takes place around the second axis of rotation.

An object of this invention is to provide an industrial truck of the general type described above but on which the operation of the door is simplified.

SUMMARY OF THE INVENTION

The invention teaches that the protection against buckling has means with which, in the closed position of the door, the intermediate leaf of the door is biased toward the open position and is in engagement with a stop that is fastened to the main leaf, whereby the intermediate leaf and the main leaf enclose or form an obtuse angle with respect to each other.

A teaching of the invention is, accordingly, to bring the intermediate leaf of the door into a defined position with respect to the main leaf in which, on account of the force-transmitting angular ratios that result from the obtuse angle, large compression forces can be transmitted with small contact forces.

Simultaneously, as a result of the construction of the invention, the desired sequence of movement is guaranteed during the opening and closing of the door.

In one preferred realization of the invention, the obtuse angle is greater than 170 degrees, in particular greater than 175 degrees. In concrete applications, the angle can be greater than 179 degrees, i.e., only very little different from a flat angle (180 degrees), for example by approximately 0.5 degree.

To achieve a bias of the intermediate leaf, this leaf is advantageously functionally connected with a spring element. The spring element can be a pneumatic spring, a torsion bar, or a torsion spring, just to name a few. The protection against buckling accordingly includes the spring element and the stop of the main leaf that interacts with the intermediate leaf.

In one preferred realization of the invention, the spring element is realized in the form of a leaf spring, which is oriented coaxially to the first axis of rotation, and is torqued in or biased toward the closed position of the door.

If the spring element is located axially between an upper hinge element and a lower hinge element, no additional space is required. When a leaf spring is used, it also thereby becomes possible to easily orient the spring coaxially to the first axis of rotation.

It is furthermore advantageous if the stop is integrated into the double hinge.

BRIEF DESCRIPTION OF THE DRAWINGS

Additional advantages and details of the invention are explained in greater detail below on the basis of the exemplary embodiment illustrated in the accompanying schematic figures, in which like reference numbers identify like parts throughout.

DESCRIPTION OF THE PREFERRED EMBODIMENTS

As shown in FIGS. 1 to 7, the industrial truck in the illustrated exemplary embodiments is realized in the form of a counterweighted fork-lift truck that has a vehicle frame 1 with a rear-mounted counterweight G. (The counterweight G can be part of the vehicle frame 1 or can be suspended on it.) On the front of the fork-lift truck there is a lifting frame that is not illustrated in the figures. Forward of the counterweight G in the direction of travel is a middle frame segment 2 into which a battery block can be inserted.

To be able to install and remove the battery block, the frame segment 2 has an upper frame opening 2a and a lateral frame opening 2b. The battery block can be extracted from the frame opening 2a upwardly by means of a crane with cargo-handling gear. Alternatively, the battery block with the cargo-handling gear hanging on the crane can be inserted or removed laterally through the frame opening 2b. Adjacent to the frame opening 2b is a bottom frame opening 2c, which can be used to run the fork arms of a second industrial truck underneath the battery block located in the industrial truck, so that the battery block can be extracted sideways from the middle frame segment 2 of the vehicle frame 1.

The lateral frame opening 2b can be closed by a door 3, which, in this exemplary embodiment, is realized in the form of an open profile construction without planking. However, a closed realization is preferred, i.e., a profile construction or a metal shell construction that includes reinforcement profiles. The door 3 can be brought into a functional connection in the closed position with a lock 4. The door 3 can be connected to the vehicle frame 1 (or to the counterweight G) by a double hinge 5, which, in the illustrated exemplary embodiment, is located in the vicinity of the transition from the counterweight G to the middle frame segment 2. The rear of the door 3 is, therefore, attached to the frame 1 (viewed in the direction of travel of the vehicle). Nevertheless, it is also possible to attach the forward edge of the door 3 to the frame 1, if such a placement appears appropriate or advantageous.

Figure 2:
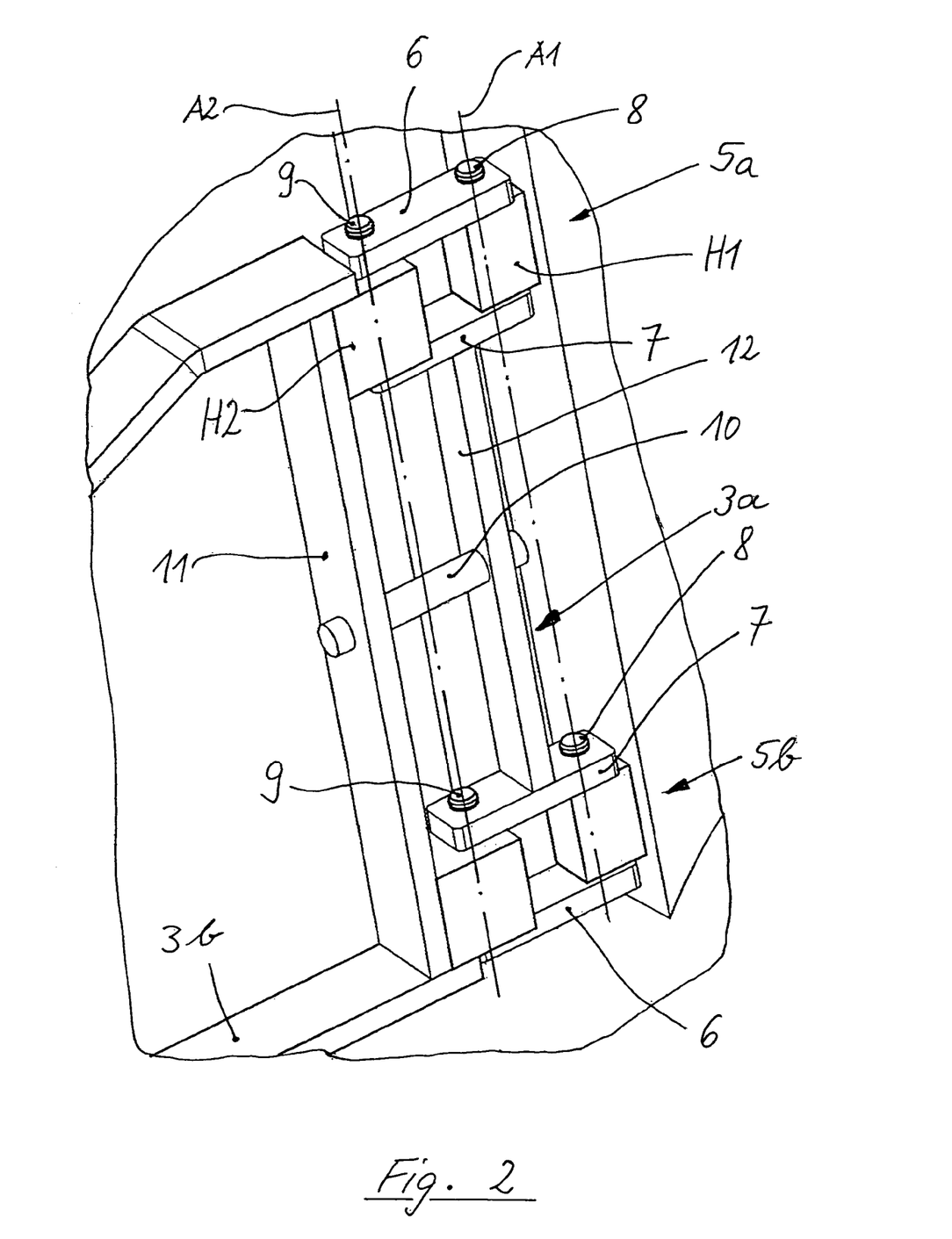
FIG. 2 is an enlarged view of the double hinge in the closed position.
Figure 3:
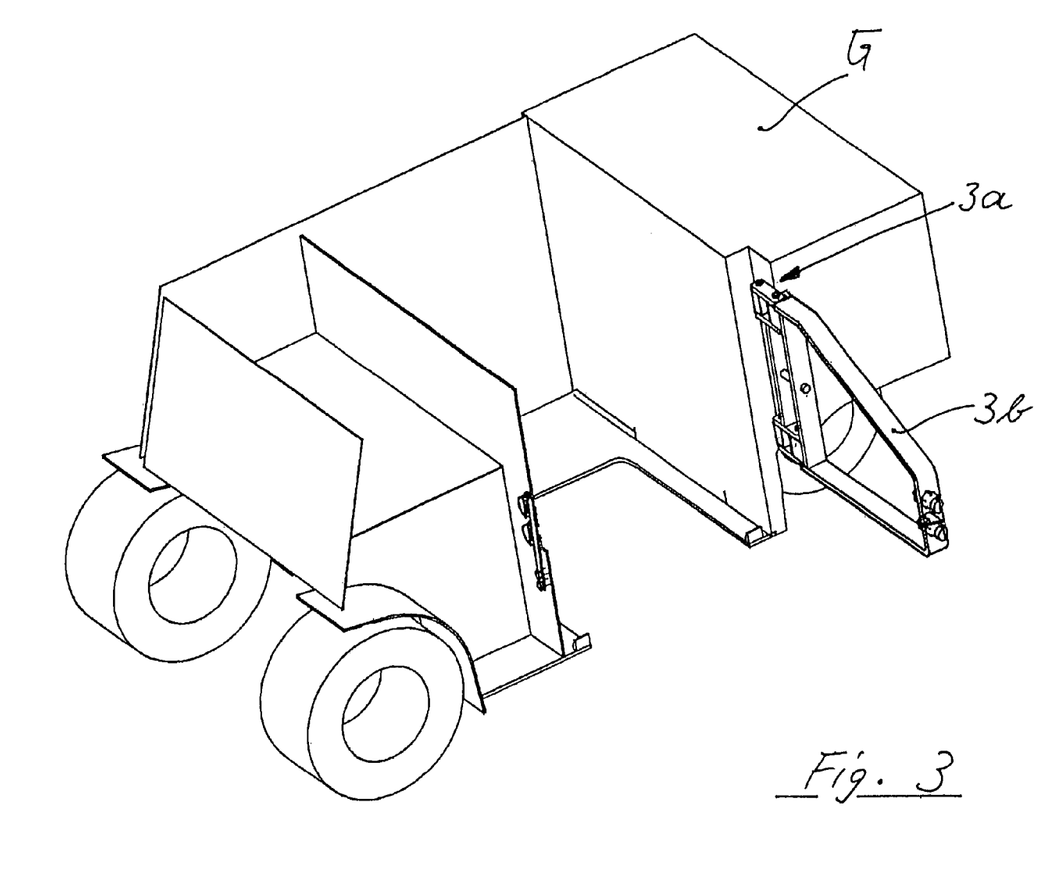
FIG. 3 is a view in perspective of the vehicle frame of FIG. 1 with the door in the 90-degree open position.
Figure 4:
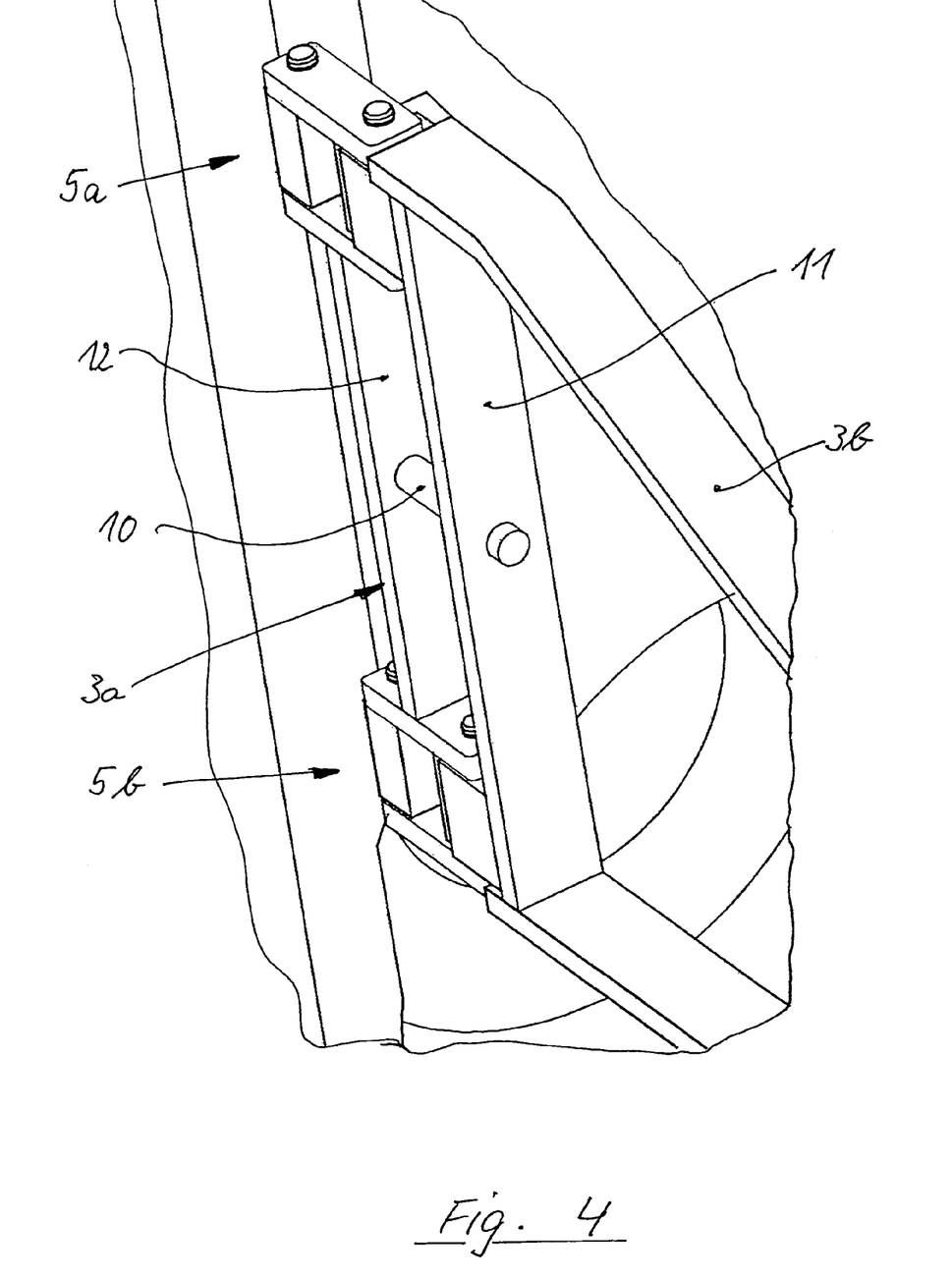
FIG. 4 is an enlarged view of the double hinge of FIG. 2 in the 90-degree open position of the door.
Figure 5:
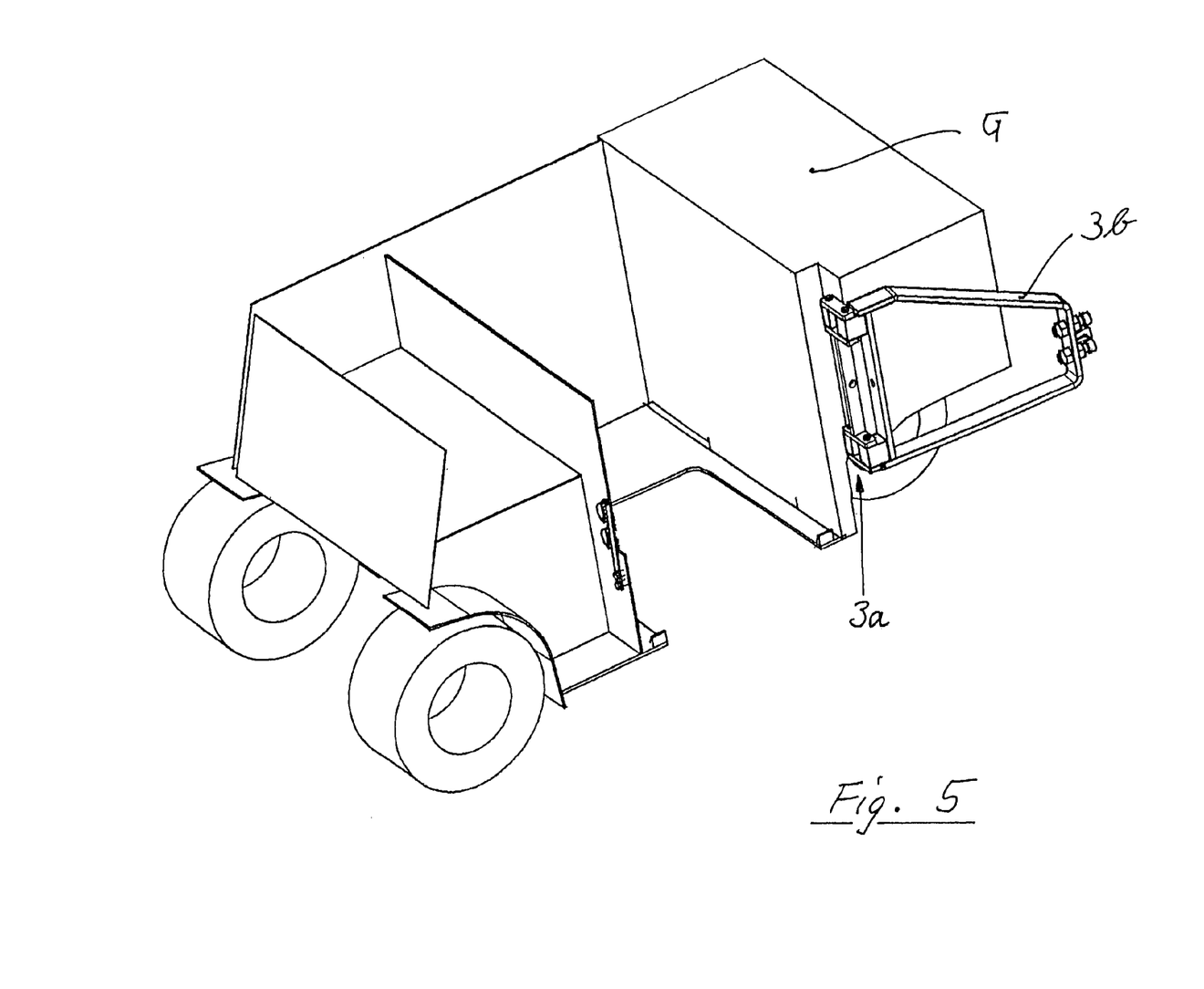
FIG. 5 is a view in perspective of the vehicle frame of FIG. 1 with the door in the 180-degree open position.
Figure 6:
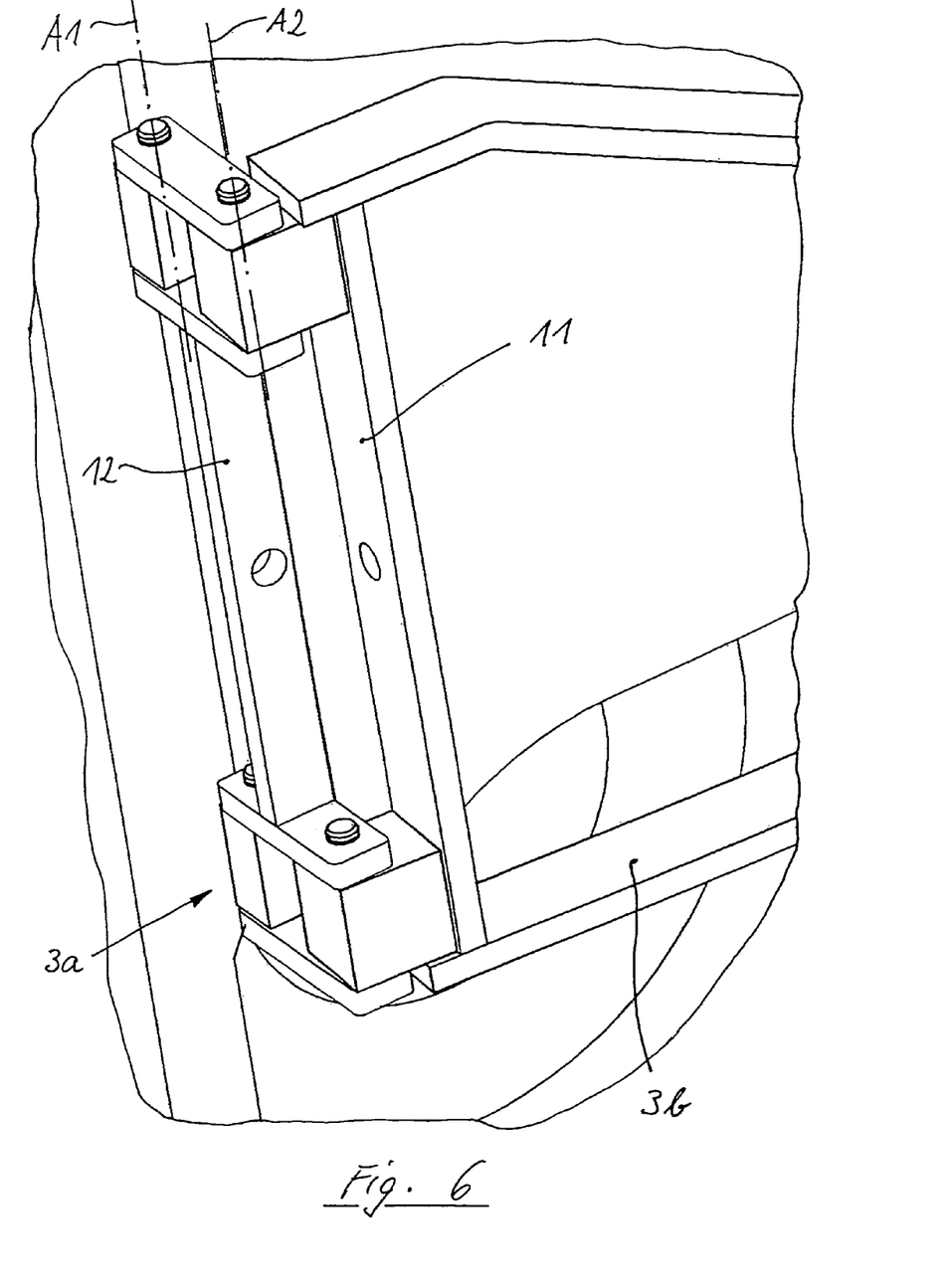
FIG. 6 is an enlarged view of the double hinge of FIG. 2 in the 180-degree open position.

The double hinge 5 has two vertical axes of rotation A1 and A2, which are parallel to and at some spaced distance from each other. In this case, a first axis of rotation A1 is firmly affixed to the frame 1 and/or to the counterweight G, and is located inside the lateral contour of the vehicle, i.e., in this case in a recess in the vehicle frame 1 and/or in the counterweight G that is offset in relation to the side of the counterweight G toward the longitudinal center plane of the vehicle. The construction of the double hinge 5 is illustrated in FIG. 2.

The double hinge 5 has a top and a bottom hinge element 5a and 5b, respectively, each of which comprises an outer hinge frame 6, an inner hinge frame 7, and two hinge pins 8 and 9.

The hinge elements 5a and 5b of the double hinge 5, which are located between the axes of rotation A1 and A2, together with a planking (not shown) form an intermediate leaf 3a of the door 3, adjacent to which is a main leaf 3b. The first axis of rotation A1 extends through the hinge pins 8, while the second axis of rotation A2 extends through the hinge pins 9. The two hinge pins 8 are fastened to the vehicle frame 1 or to the counterweight G by means of brackets H1 (top and bottom). The hinge pins 9 are in brackets H2 (top and bottom) of the main leaf 3b of the door 3. The intermediate leaf 3a of the door 3 can be pivoted around the axis of rotation A1. The main leaf 3b, considered in isolation, can be pivoted around the axis of rotation A2 or together with the intermediate leaf 3a around the axis of rotation A1.

In the closed position, the door 3 is designed to provide reinforcement for the frame 1. A rotation of the main leaf 3b around the second axis of rotation A2 is temporarily blocked to make it possible to transmit compression forces and also to achieve a defined sequence of motion of the main leaf 3b with respect to the intermediate leaf 3a during the opening and closing of the door 3.

For this purpose, a locking rod 10 is provided, with which the main leaf 3b can be fixed in position with respect to the intermediate leaf 3a. The locking rod 10 thereby runs in the horizontal direction through a vertical strut 11 of the main leaf 3b and a vertical strut 12 of the two hinge elements 5a and 5b that connect the inner hinge frames 7 of the two hinge elements 5a and 5b of the double hinge 5, i.e., of the intermediate leaf 3a. Consequently, the main leaf 3b of the door 3, when the locking rod 10 is engaged, can be pivoted only around the first axis of rotation A1. The first axis of rotation A1 thereby remains always attached to the frame 1, while the second axis of rotation A2 changes its position, and when the door 3 is in a 90-degree open position, for example (see FIGS. 3 and 4), is outside the lateral contour of the vehicle.

Only when the locking rod 10 is removed or at least disengaged can the main leaf 3b be pivoted around the second axis of rotation A2. As a result of which, the door 3 can be opened beyond 90 degrees, up to 180 degrees (see FIGS. 5 and 6), without the door 3 coming prematurely into contact with the counterweight G.

Figure 1:
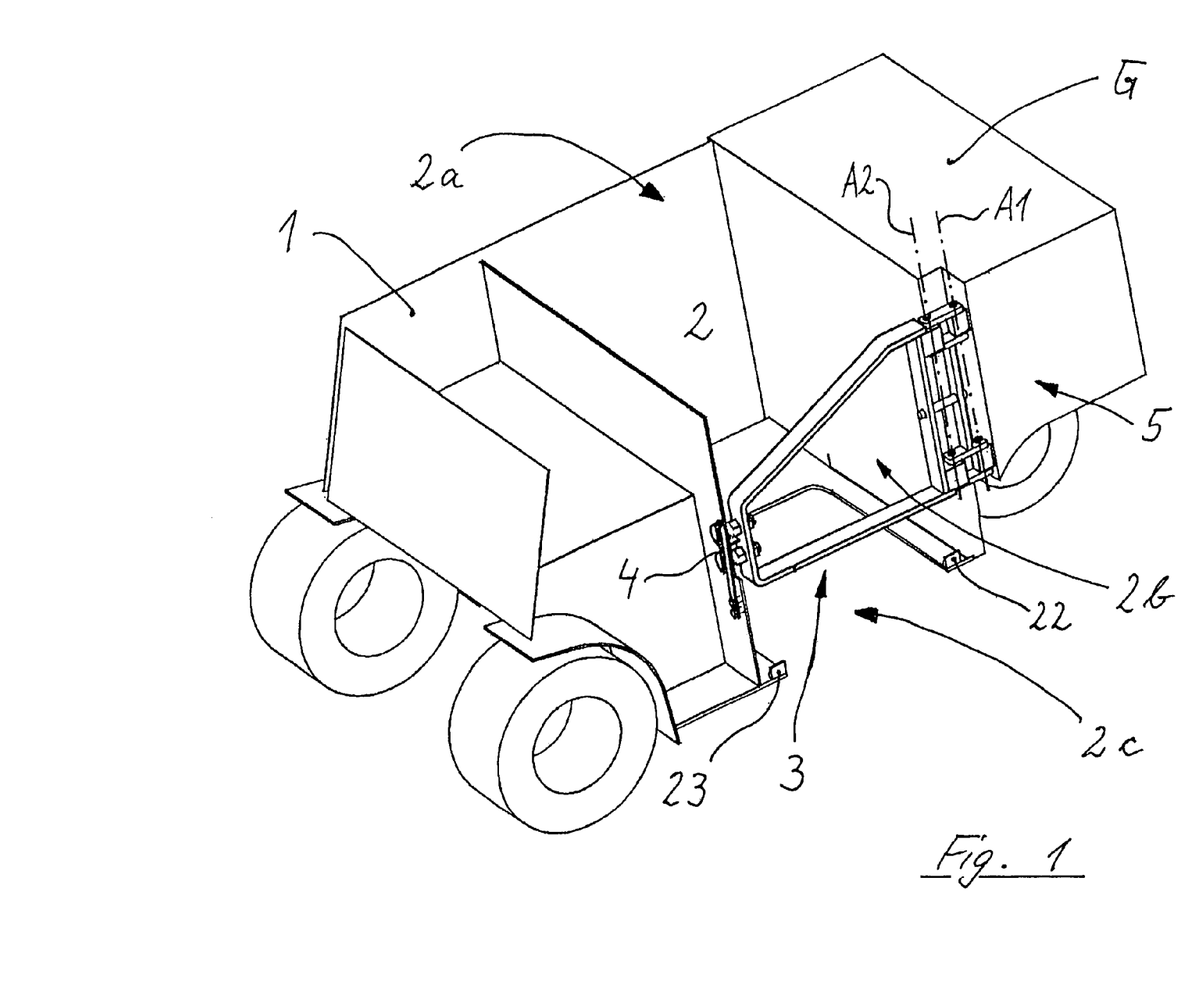
FIG. 1 is a view in perspective of the vehicle frame of an industrial truck with the door in a closed position.

To prevent the door 3, the lock 4, and the double hinge 5 from being stressed in the transverse direction and possibly damaged by the forces of gravity exerted by the installed battery block, there are end stops 22, 23 that are located in the floor area of the vehicle frame 1 (see FIG. 1, for example).

It goes without saying that a transmission of forces in the longitudinal direction of the door 3, i.e., the desired frame reinforcement by the door 3, is not possible if the operator forgets to re-engage the locking rod 10 after changing the battery block and closing the door 3.

Figure 7:
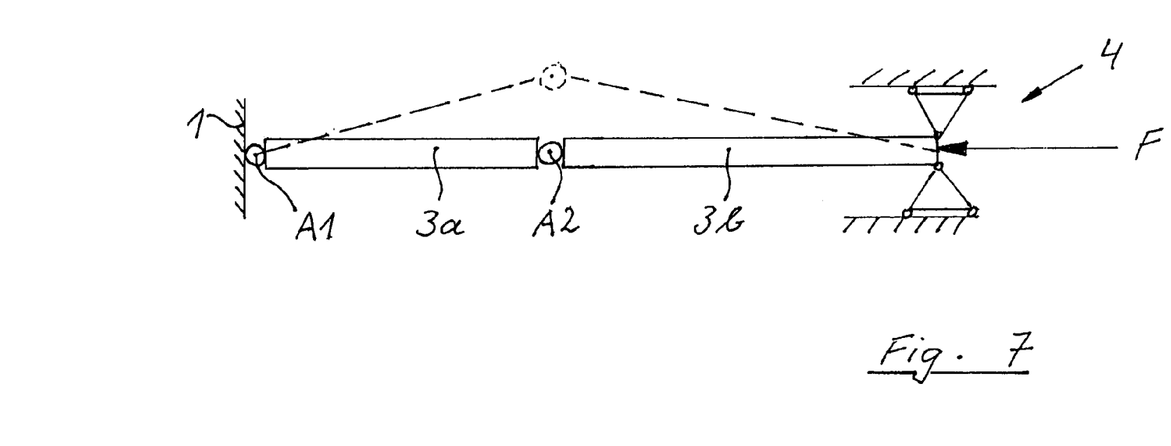
FIG. 7 is a schematic drawing of an overhead view of the door in the closed position without protection against buckling.

FIG. 7 is a schematic drawing that shows the door 3, from overhead, in the closed position and the effect that would result from the lack of protection against buckling. When a compression force F is exerted in the longitudinal direction of the door 3, the articulated connection of the intermediate leaf 3a to the main leaf 3b would buckle the door 3 outwardly in the vicinity of the axis of rotation A2 (dashed line). In that case, the door 3 would not have any function of reinforcing the frame 1.

Figure 8:
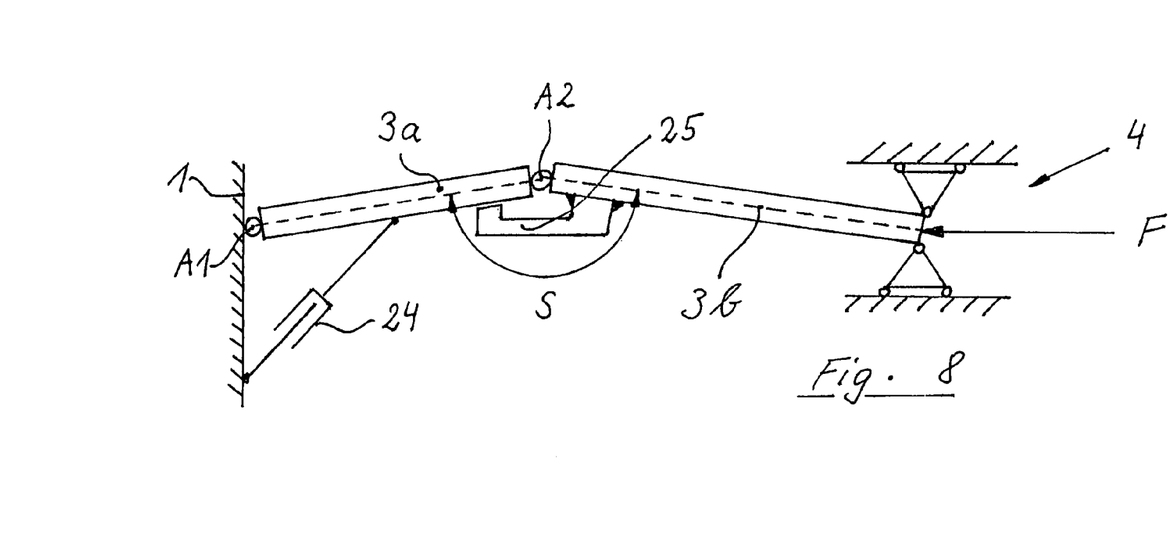
FIG. 8 is a schematic drawing of an overhead view of the door illustrated in FIG. 7 in the closed position with the protection against buckling.
Figure 9:
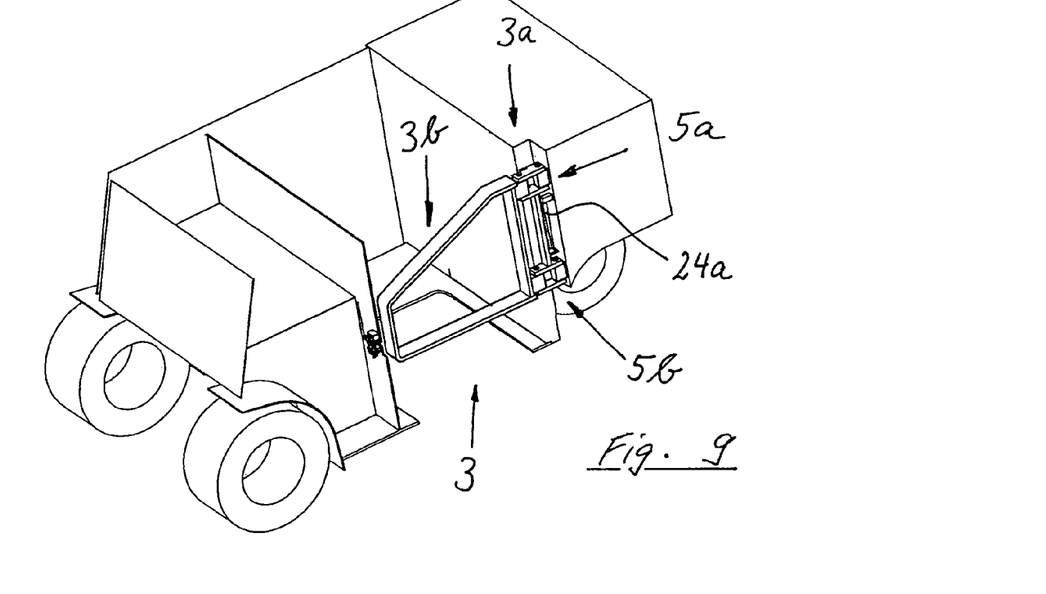
FIG. 9 is a view in perspective of the vehicle frame of an industrial truck of the invention with a closed door.
Figure 10:
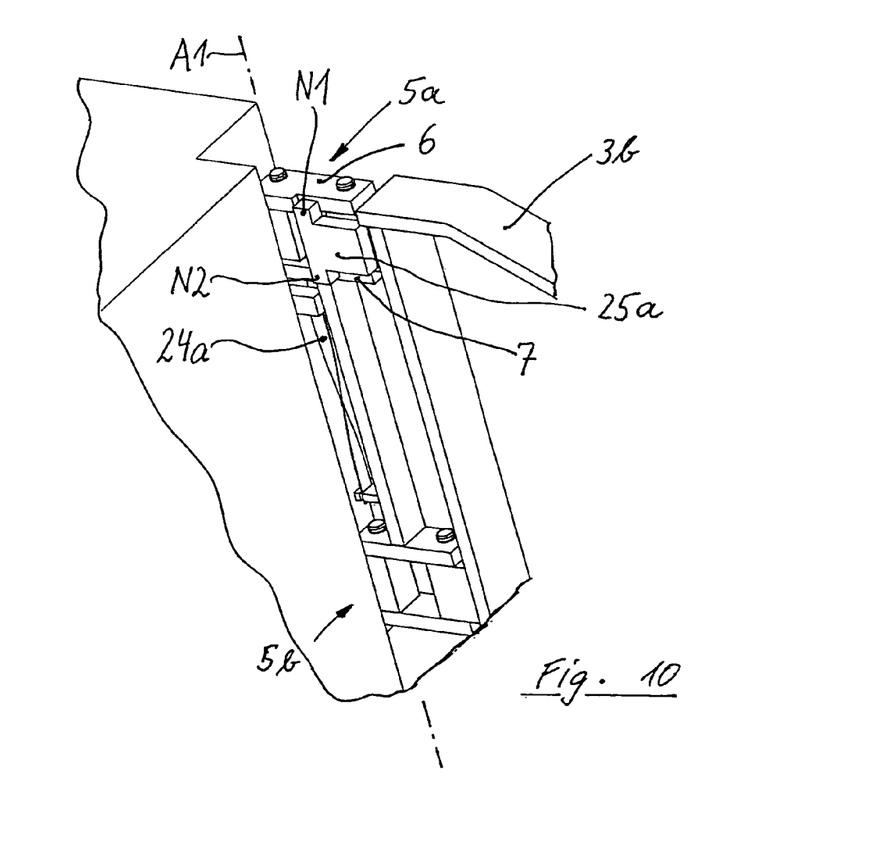
FIG. 10 is an enlarged view of the closed door of FIG. 9.

However, on the industrial truck of the invention, there is protection against buckling that is automatically active (see the schematic illustration in FIG. 8). The intermediate leaf 3a is functionally connected with a spring element 24 (in this case a pneumatic spring), which produces a force that acts in the opening direction when the door 3 is in the closed position. The intermediate leaf 3a can thereby be pushed outwardly, but only slightly, because a stop 25, which is located on the main leaf 3b, limits the opening angle to a very small value, e.g., 0.5 degree. The main leaf 3b and the intermediate leaf 3a thereby enclose an obtuse angle S, for example 179.5 degrees, corresponding to an opening angle of 0.5 degree of the intermediate leaf 3a. As a result of the angular ratios that then exist, a relatively large compression force F can be transmitted by the main leaf 3b to the intermediate leaf 3a and into the vehicle frame 1, whereby only a relatively small opposing force is applied at the stop 25.

When the lock 4 is disengaged, the spring element 24 assists the opening movement of the door 3 or acts as an automatic door opener. The desired sequence of movement, namely first a pivoting movement of the complete door 3 around the axis of rotation A1 followed by a pivoting movement of the main leaf 3b of the door 3 around the axis of rotation A2 (which is pivoted outwardly), is guaranteed by the protection against buckling on the industrial truck of the invention.

Compared to a protection against buckling in the form of a locking rod, as described above, there is no requirement for monitoring on this protection against buckling, which functions automatically.

One exemplary realization of the protection against buckling on the industrial truck of the invention is illustrated in FIGS. 9 to 14. In this case, coaxial to the first axis of rotation A1 between the two hinge elements 5a and 5b there is a leaf spring 24a (see in particular FIG. 10, the view being from inside to outside), which is torqued when the door 3 is closed and thereby exerts an outward force on the intermediate leaf 3a, i.e., in the opening direction. Buckling is prevented by a stop element 25a that is integrated into the upper hinge element 5a of the double hinge 5. In this case, the stop element 25a is fastened to the bracket H2 of the door 3, e.g., welded in place. When the door 3 is in the closed position, two lugs N1, N2 of the stop element 25a come into contact against recesses in the outer hinge frame 6 and in the inner hinge frame 7, and prevent the door 3 from buckling. Alternatively or additionally, it is also possible, of course, to provide this construction for the lower hinge element 5b.

Figure 11:
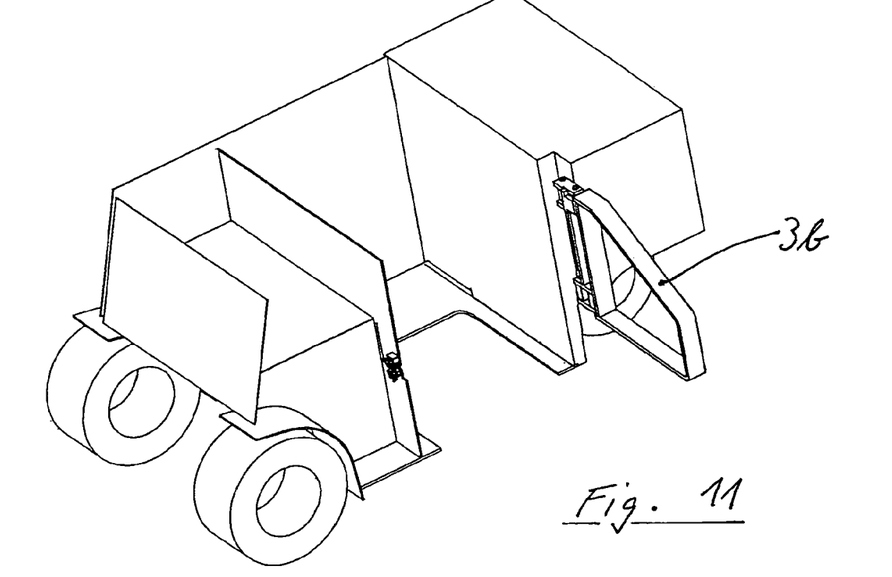
FIG. 11 is a view in perspective of the vehicle frame of the industrial truck of the invention in FIG. 9 with the door in the 90-degree open position.
Figure 12:
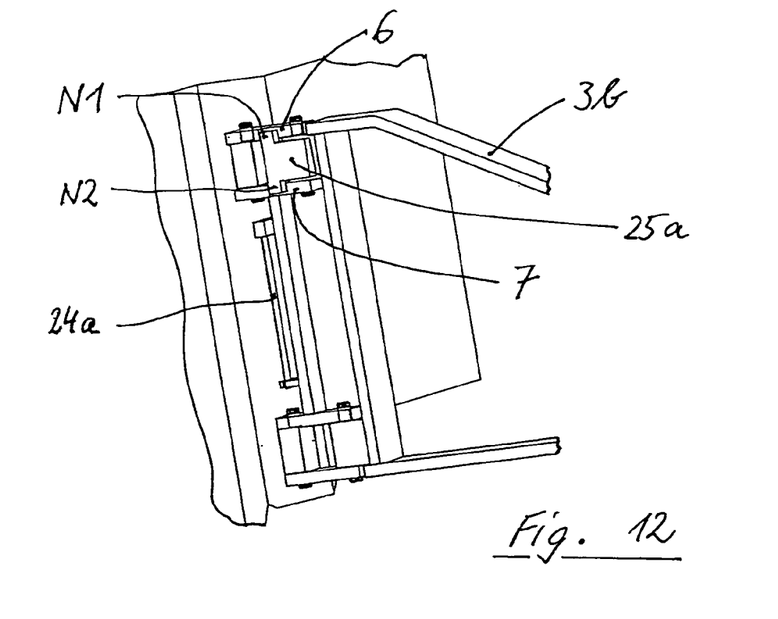
FIG. 12 is an enlarged view of the door of FIG. 9 in the 90-degree open position.
Figure 13:
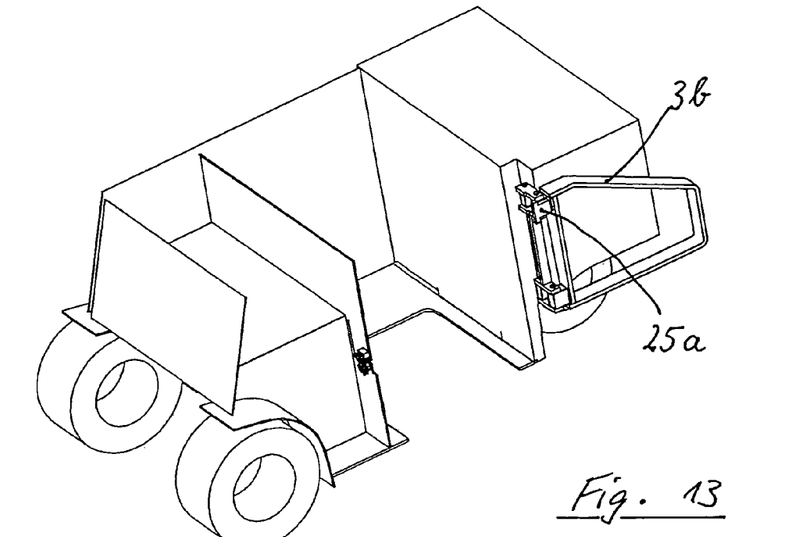
FIG. 13 is a view in perspective of the vehicle frame of the industrial truck of the invention in FIG. 9 with the door in the 180-degree open position.
Figure 14:
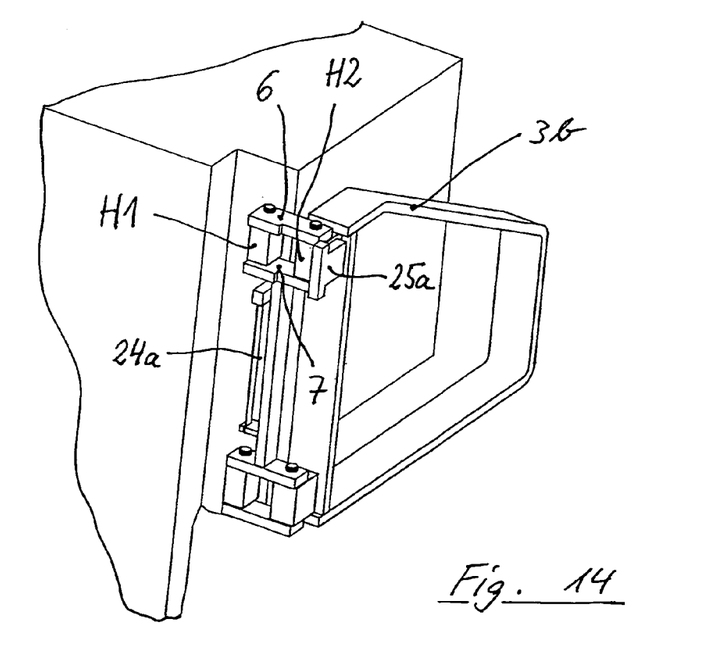
FIG. 14 is an enlarged view of the door of FIG. 12 in the 180-degree open position.

FIGS. 11 and 12 show the door 3 in the 90-degree open position. In this case, the leaf spring 24a is relaxed. In the 180-degree open position of the door 3 (FIGS. 13 and 14), the position of the intermediate leaf 3a remains unchanged, while the main leaf 3b of the door 3, including the brackets H2 and consequently together with the stop element 25a, continues to pivot farther.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
a vehicle frame having a frame segment with a lateral frame opening to hold a battery block;
a door pivotably connected to the frame to cover the frame opening, wherein the door is pivotable outwardly around a substantially vertical axis of rotation, wherein the door is connected to the vehicle frame by a double hinge, and wherein a second axis of rotation of the door is parallel to and at a spaced distance from a first axis of rotation and the second axis of rotation changes its position when the door is pivoted around the first axis of rotation; and
protection against buckling configured such that when the door is in a closed position, an intermediate door leaf that is located between the axes of rotation can be blocked in position with respect to an adjacent main leaf, wherein the protection against blocking comprises a spring element which, in the closed position of the door, biases the intermediate leaf toward the open position and is in engagement with a stop fastened to the main leaf, and wherein the intermediate leaf and the main leaf enclose an obtuse angle.

2. The industrial truck as claimed in claim 1, wherein the obtuse angle is greater than 170 degrees.

3. The industrial truck as claimed in claim 1, wherein the intermediate leaf is functionally connected with the spring element.

4. The industrial truck as claimed in claim 3, wherein the spring element comprises a leaf spring, which is oriented coaxially to the first axis of rotation and is torqued in the closed position of the door.

5. The industrial truck as claimed in claim 3, wherein the spring element is located axially between a top and a bottom hinge element.

6. The industrial truck as claimed in claim 4, including a stop element integrated into the double hinge.

7. The industrial truck as claimed in claim 1, wherein the obtuse angle is greater than 175 degrees.

8. The industrial truck as claimed in claim 2, wherein the intermediate leaf is functionally connected with the spring element.

9. The industrial truck as claimed in claim 8, wherein the spring element comprises a leaf spring, which is oriented coaxially to the first axis of rotation and is torqued in the closed position of the door.

10. The industrial truck as claimed in claim 4, wherein the spring element is located axially between a top and a bottom hinge element.

11. The industrial truck as claimed in claim 5, including a stop element integrated into the double hinge.

* * * * *